Nov. 12, 1957 C. W. GORDON 2,812,934
APPARATUS FOR DRYING MATERIAL SLURRY AND INTRODUCING
INTO A KILN WHICH CALCINES OR OTHERWISE TREATS IT
Filed Oct. 19, 1951 2 Sheets-Sheet 1

INVENTOR
Charles W. Gordon
BY
C. F. Bryant
ATTORNEY

Nov. 12, 1957 C. W. GORDON 2,812,934
APPARATUS FOR DRYING MATERIAL SLURRY AND INTRODUCING
INTO A KILN WHICH CALCINES OR OTHERWISE TREATS IT
Filed Oct. 19, 1951 2 Sheets-Sheet 2
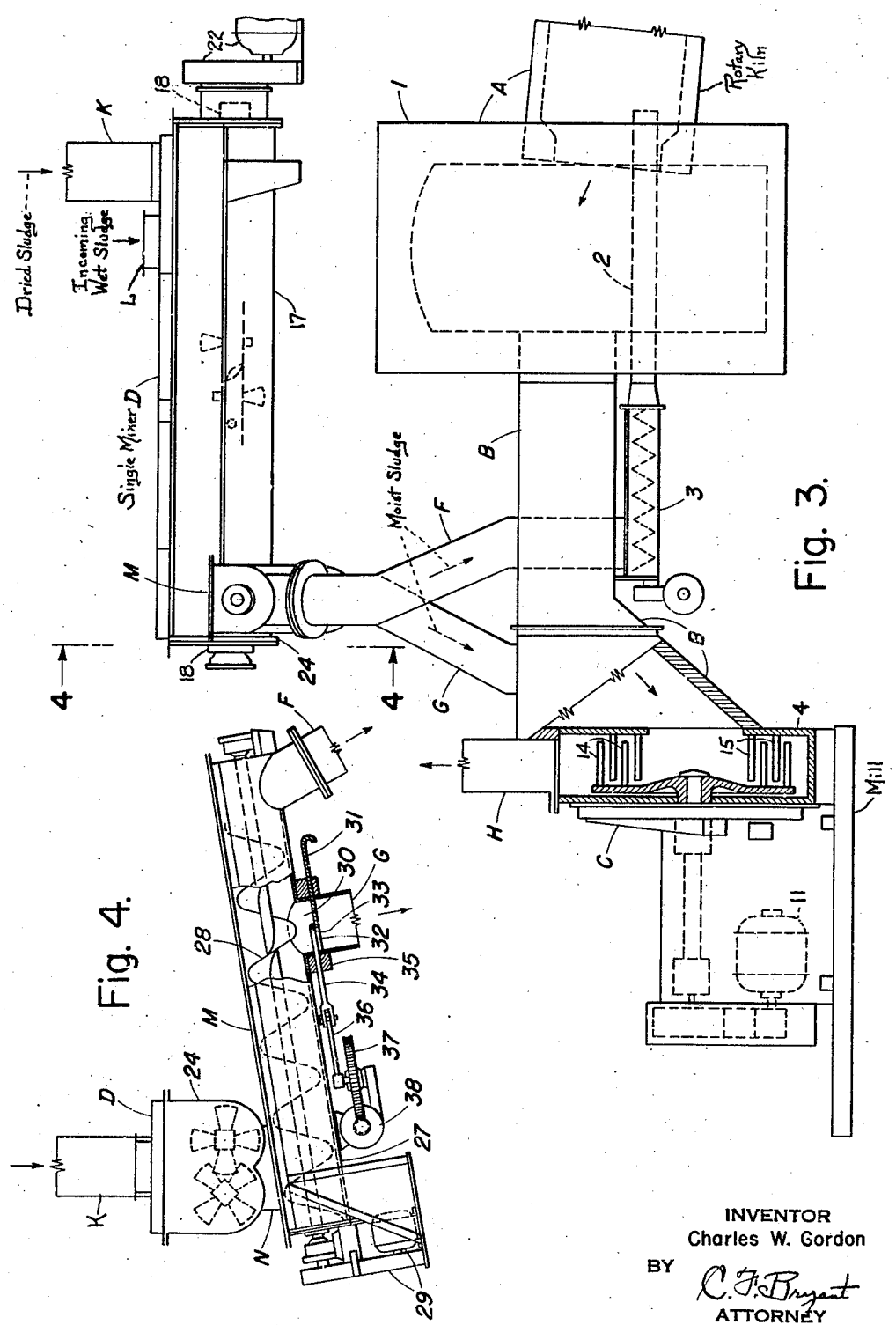
INVENTOR
Charles W. Gordon
BY
C. F. Bryant
ATTORNEY

United States Patent Office 2,812,934
Patented Nov. 12, 1957

2,812,934

APPARATUS FOR DRYING MATERIAL SLURRY AND INTRODUCING INTO A KILN WHICH CALCINES OR OTHERWISE TREATS IT

Charles W. Gordon, Glen Ellyn, Ill., assignor to Combustion Engineering, Inc., New York, N. Y., a corporation of Delaware Application October 19, 1951, Serial No. 252,074

5 Claims. (Cl. 263—32)

This invention relates to improved apparatus for drying material such as calcium carbonate sludge or slurry prior to its introduction into a kiln which calcines or otherwise treats the slurry.

Illustrative explanation will be made through reference to slurry of calcium carbonate which is to be calcined in a rotary kiln; but as the description proceeds it will become apparent that application also is possible to sludges or slurries of various other materials treatable in comparable fashion.

The present practice in the burning of calcium carbonate to make lime is to mechanically dewater the collected lime sludge or slurry by passing it through a vacuum filter or through a centrifuge to thereby increase the dry solids content of the sludge from about ten percent to about sixty percent. The remaining moisture is then removed within a rotary kiln wherein the mechanically dried sludge or so called lime mud slurry is exposed to a hot drying medium to further evaporate and calcine that dewatered sludge.

The primary function of the kiln is to calcine the calcium carbonate by burning the introduced slurry thereof. By partially drying the dewatered slurry before introduction into the kiln, it is evident that the kiln may be relieved of the necessity of that drying and will thereby be reserved for substantially only its primary function of calcining the sludge. My invention contemplates such predrying of the incoming slurry whereby the capacity of the kiln can be increased and the entire apparatus can be operated more efficiently than before, and it utilizes the hot gases discharged from the kiln to effect the slurry predrying just mentioned.

One object of this invention is to provide improved apparatus whereby slurries of material such as dewatered calcium carbonate can be efficiently predried prior to their introduction into a kiln wherein the slurry is calcined into lime or otherwise treated.

Another object is to increase the quantity of lime or other material which can be produced or processed in a kiln of given dimensions and capacity rating.

A further object is to decrease the quantity of fuel that is required to burn each ton of lime or other material slurry processed in the kiln.

A still further object is to accomplish requisite predrying of the slurry and introduction into the kiln through use of but a single mixer.

Other objects and advantages of the invention will become apparent from the following description of illustrative embodiments thereof when taken in conjunction with the accompanying drawings, wherein:

Fig. 3 is a view in elevation and partly in section of another form of the invention; and Fig. 4 is a cross section taken on line 4—4 of Fig. 3.

Figure 1:
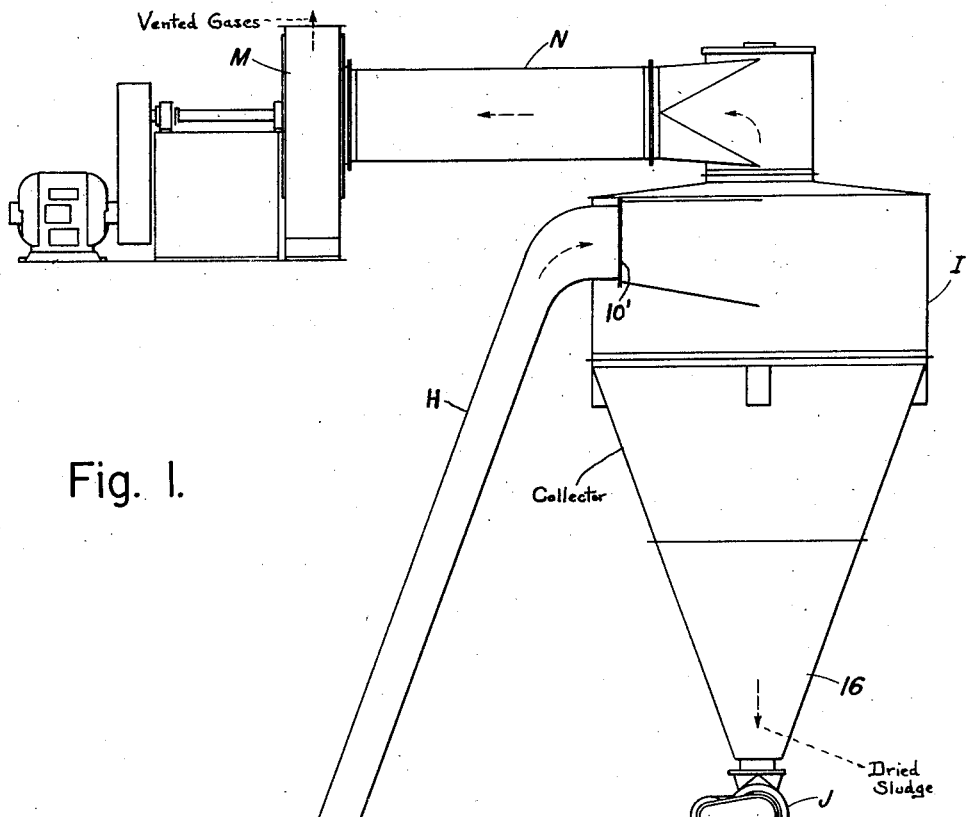
Fig. 1 is a view in elevation and partly in section of one form of the apparatus embodying the invention.
Figure 2:
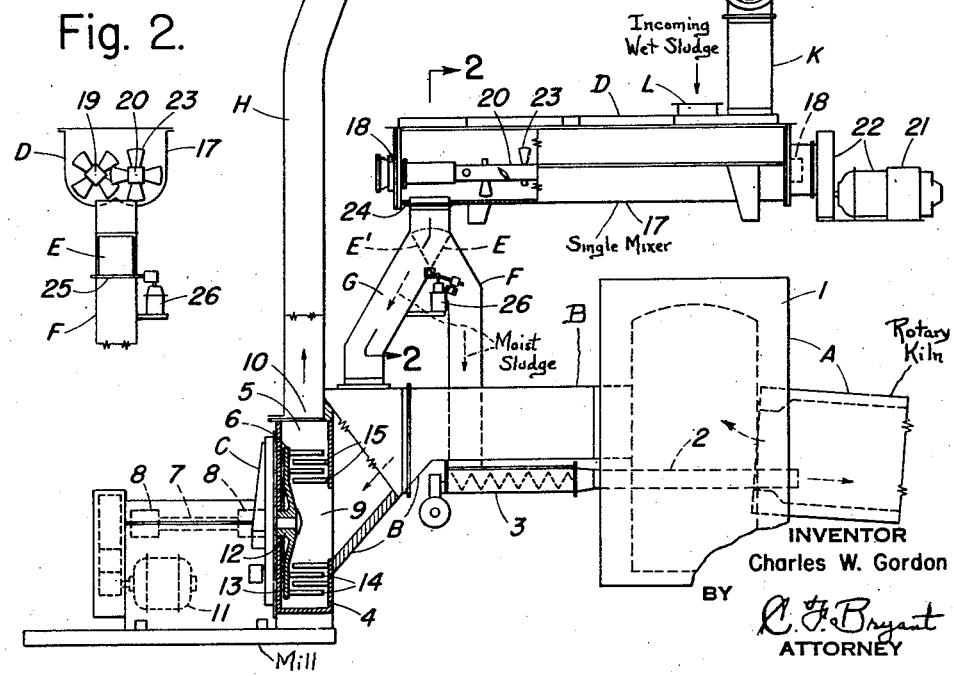
Fig. 2 is a cross section through the mixer and dry divider taken on line 2—2 of Fig. 1.

The Figs. 1–2 apparatus utilizing dry divider

Looking first at Fig. 1, the apparatus there shown comprises a kiln A of conventional type connected to a cage mill C by a conduit B through which conduit the hot gases from kiln A are conveyed to said cage mill C. A mixer D receives dewatered sludge and dried sludge at its one end (right in Fig. 1) in predetermined proportions and thoroughly mixes them to a slurry mixture of substantially higher solids content than the incoming dewatered sludge, while advancing the mixture to its other end (left in Fig. 1) where it is discharged from the mixer D into a dry divider device E.

This dry divider E directs predetermined proportions of the mixture from the mixer D into the kiln A via conduit F and from the mixer D into the cage mill C via conduit G. That portion of the slurry mixture entering the kiln A is calcined therein and that portion entering duct B meets the hot gases from the kiln A and flows with the gases into the cage mill C. Said cage mill C disintegrates the mixture of sludge or slurry in the presence of the hot gases from kiln A and because of the turbulence within the mill, the sludge mixture is rapidly dried by the gases.

The dried sludge and moisture-laden gases are discharged from the cage mill C via duct H into cyclone collector I wherein the dried disintegrated sludge is separated from the moisture laden drying gases. The dried sludge or slurry passes from the collector I via an airlock J and duct K into the mixer D: Incoming wet sludge or slurry enters the mixer through inlet opening L; and a fan M exhausts the separated gases from collector I via duct N and discharges them into the atmosphere.

The kiln A has only one (the left) of its two ends shown here; the opposite (or right) end communicating with a suitable source of heat and being arranged for discharge therefrom of the calcined lime or other treated material. This kiln is the well known cylindrical rotary type whose represented left end communicates with the kiln housing (or duct chamber) 1 into which the hot gases issuing from the kiln discharge. A discharge pipe 2 delivers into the interior of kiln A the mixture of wet and dry sludge leaving the mixer D via divider E, duct F and feeder 3 that communicates with pipe 2. This feeder 3 is here illustratively indicated as being of the well known motor driven screw feed type.

Hot gases from kiln A's housing 1 are conveyed to the cage mill C by the earlier mentioned conduit B. If desired this housing 1 may be provided with a by-pass stack (not shown) through which a portion of the hot gases from kiln A may at times (i. e., when not needed for slurry pre-drying) be vented directly to atmosphere without passing through the slurry drying devices C and I.

The cage mill C is illustratively shown as being similar to that disclosed in U. S. patent to Gordon No. 2,539,775; but as the description proceeds it will become apparent that other generally equivalent forms of disintegrator apparatus also can be utilized.

The cage mill here represented (in cross section by Fig. 1) at C comprises a casing 4 bounding a chamber 5 within which is a beater 6 mounted for rotation on the overhanging end of a shaft 7 which is supported in bearings 8 outside the casing 4. The casing is provided with an inlet 9 for the entry of the mixture of wet and dry sludge from the mixer D together with the stream of hot gases from the conduit B, and an outlet 10 through which the partly dried material leaves suspended in the gas stream. Shaft 7 is rotated by a motor 11 through well known driving means; and on the shaft end extending into the casing 4 is mounted a hub 12 onto which is fastened a circular plate 13 from which there extends across the chamber 5 a set of rods 14. These rods 14 are arranged to lie in concentric circular rows about the shaft 7 and rotate with the circular plate 13. There are other sets of rods 15 arranged in alternate concentric circular rows about the shaft 7 with respect to the set of rods 14 and are spaced radially apart therefrom. Said latter rods 15 are stationary and are fastened to the casing 4.

The mixture of wet and dried material slurry entering (from conduit G) through inlet 9 is intimately mixed with the hot gases (from kiln A and conduit B) while passing between the rotating and stationary rods 14 and 15 of cage mill C. This causes moisture in the material to flash into stream; one representative temperature for the gases discharging from kiln A into cage mill C being of the order of 1400° F. The moisture laden gases and dried material then leave the mill C through outlet 10 and flow upwardly through duct H into collector I.

This collector I is here illustratively shown as being of the well known cyclone or centrifugal type having the usual tangential inlet 10' through which the gas and material mixture from duct H enters the collector. The separated dried material which collects in the hopper bottom 16 is removed therefrom by an air lock J which is of the known motor driven rotatable star-wheel type by which pocketfuls of material are removed from the hopper I and successively deposited into the mixer D.

In the arrangement of Figs. 1-2 said mixer D receives dried sludge from the collector I via air lock J and duct K, and via opening L also receives incoming wet sludge or slurry which has been mechanically dewatered. The mixer here illustratively shown at D utilizes a casing 17 equipped with end bearings 18 that carry two shafts 19 and 20 (see Fig. 2) which are geared to rotate in opposite directions. These shafts 19 and 20 are driven by a motor 21 through suitable reduction gearing in gear case 22; and they are provided with propeller blades 23 which when rotated advance the material (from right to left in Fig. 1) toward the discharge end 24 of the mixer. The blades 23 mounted on shaft 19 are sloped at an angle, with respect to the shaft axis, opposite to the angle of the blades 23 mounted on shaft 20 so that during rotation of both shafts the blades thereon cooperate to mix and to advance the material in the direction of toward mixer end 24.

Upon delivery to said end 24 the material so mixed within device D is discharged from casing 17 thereof into dry divider E. In the illustrative form here shown said dry divider is organized in the general manner disclosed by U. S. Patent to Smith No. 2,157,775. It utilizes a damper E mounted within the Y-junction of ducts F and G with its shaft 25 (see Fig. 2) located at the inner intersection of the ducts. This damper swings back and forth between first position E and second position E', thereby causing material received from the mixer D to flow alternately into duct G and into duct F.

Such back and forth operating movement by damper E can be imparted thereto in any suitable manner such as by solenoid 26 linked to the shaft 25 through a crank in well known manner. The solenoid receives electric current via a time switch (not shown) so that it moves and holds the damper for controlled time intervals in positions E and E'. By varying the relative lengths of these position E and position E' time intervals the quantity of slurring mixture going into cage mill C can be increased or decreased in relation to that going into kiln A. Such adjustment has a usefulness presently to be made evident.

By this action of the dry divider, predetermined quantities of the sludge mixture from mixer D are caused to flow into the cage mill C (via duct G) and into the kiln A (via duct F, feeder 3 and pipe 2).

The portion of the mixture so directed to duct F is received by the feeder 3 and delivered by it at a substantially uniform rate into kiln A through the duct or pipe 2; and the portion of the mixture directed to duct G falls into the hot gas stream from kiln A passing through conduit B and flows therewith into the cage mill C.

According to the invention the just described apparatus of Figs. 1-2 is uniquely organized so that all of the dried material from the cyclone collector I is delivered to the single mixer D wherein a controlled proportion of the dried material is mixed with the incoming (at L) partly dried dewatered material so that the resulting slurry mixture entering dry divider E has a moisture content that is suitable for calcining in the kiln A.

Were the calcium carbonate sludge (or other incoming material) to be predried to approximate bone dryness and then be introduced into the kiln, a very large portion of the dried fine material would be entrained by the exhaust gases from the kiln and would again pass through the predrying system comprising the mill C, the collector I, mixer D and divider E. This obviously would be objectionable.

The improved apparatus organization here disclosed overcomes such objection. In said new organization a suitable moisture content of the mixture leaving the mixer D is maintained by controlling the amount of the mixture to be dried in the drying system; such control being effected by dry divider E in the arrangement of Figs. 1-2. In one illustrative application for handling calcium carbonate slurry, the moisture content of the mixture discharged from mixer D into the kiln A (and also into cage mill C) varies from about 5% to 18%; the mixture apportioned to the drying system via entry into the cage mill C is dried therein to about 0.2% to 4% moisture content; and such dried material is then returned via cyclone collector I into mixer D for reducing the moisture content of the incoming raw wet slurry entering the system via mixer opening L.

As mentioned previously, by so partly predrying the incoming lime mud or other slurry, most of the work of evaporation can be removed from the kiln A thereby permitting the kiln to perform its primary function of calcining at a greater capacity and more efficiently because the kiln's hot exhaust gases (whose heat content otherwise would be wasted) are now used for drying. The following moisture content values observed during actual processing of calcium carbonate slurry will illustrate: Raw wet slurry fed into mixer D via opening L averaged about 35% moisture; dried slurry discharged by collector I into mixer D via conduit K averaged about 1% moisture; and the mixed slurry supplied from mixer D to kiln A via conduits F and 2 averaged about 8% moisture.

The advantages resulting from the use of the described drying system in combination with a kiln are then, an increase in the amount of lime or other material which the kiln can produce, a decrease in the fuel required per ton of lime or other material burned, and the novel use of but a single mixer D to prepare the sludge for use in both the kiln A and in the drying system (including mill C). This last improvement results in a simplified apparatus with reduction in equipment such as duct work, conveyors and associated motors and controls.

*The modified apparatus of Figs. 3-4*

A modified form of the improved apparatus is disclosed by Figs. 3 and 4 wherein certain portions of the complete system of Fig. 1 have been reproduced; like reference characters designating like parts in both sets of drawing views.

The dry divider shown at E in Figs. 1-2 is one form of means for apportioning the material delivered by the mixer D to the mill or drier C and to the kiln A; but still other means for accomplishing the desired apportioning also can be employed. As shown in Figs. 3 and 4, one such other means may take the form of a screw conveyor M which receives the material from single mixer D via connection N (Fig. 4). The material from the receiving end, at connection N, is advanced through the housing 27 of conveyor M by a helical screw 28 which is driven by motor and gears 29.

A portion of the material is delivered through the opposite end of screw conveyor M into the conduit F whence the screw feeder 3 discharges it through pipe 2 into the kiln A. Intermediate the ends of the housing 27 of conveyor M, and in the bottom thereof, is an opening 30 (Fig. 4). Conduit G connects to the conveyor M at this opening 30. Below opening 30 is a gate 31 providing a controlled opening 32 in conduit G through which a controlled portion of the mixture passing through the conveyor M may be removed. Conduit G is connected to the conduit B into which said controlled removed portion is delivered into the hot gas stream flowing from the housing 1 of kiln A into the mill C.

If necessary, agitating means may be provided to assure a uniform material flow from the conveyor M through the opening 32 of gate 31 and into conduit G. Such means may include a bar or bars 33 which are moved back and forth across the opening 32 formed by the gate 31 to agitate the material and prevent its clogging above the opening. The bar 33 here shown is fastened to a shaft 34 which passes through a stuffing box 35 in the wall of conduit G and is reciprocated by the connecting rod 36 and crank 37 in a known manner. The crank 37 may be rotated by a motor 38 through gears in a known manner. If desired two reciprocating shafts 34 may be used, one at each side of the opening 32, and the bar or bars 33 fastened between and to each of the shafts.

In operation the modified organization of Figs. 3–4 functions in essentially the same manner as does the Figs. 1–2 arrangement already described in detail. That is, a suitable moisture content of the slurry leaving the mixer D is maintained by controlling the amount of mixture to be dried in the drying system; such control being effected by adjusting gate 31 for opening 32 in housing 27 of conveyor M. As the span of this opening 32 is made wider, more of the material from conveyor M goes into the cage mill C and less into the kiln A; while adjustment of gate 31 in the closing direction causes less of the material from conveyor M to go into the cage mill and more into the kiln.

In this way there is made possible the same desirable adjustment features as have been described for Figs. 1–2 wherein dry divider E is used. The earlier enumerated practical advantages resulting from the Figs. 1–2 organization are therefore also realized through use of modified apparatus here depicted by Figs. 3–4.

While preferred embodiments of the invention have been here shown and described, it will be understood that these embodiments are illustrative rather than restrictive and that changes in construction, combination, and arrangement of parts may be made without departing from the spirit and scope of the invention as claimed. Moreover, even though calcium carbonate sludge has been illustratively referred to throughout this disclosure, it will be apparent that slurries of other materials likewise can be treated with comparable benefit and are therefore processable by apparatus incorporating the present improvements.

What I claim is:

1. In apparatus for continuously reducing the moisture content of a slurry prior to its treatment in a kiln, the combination of a kiln, supply means for wet slurry; a drying means for converting moist slurry into dried slurry; a single mixer receiving wet slurry from said supply means and also all of the dried slurry from said drying means and serving to mix the two received slurries in proportions which yield a moist slurry mixture that is suitable for treatment in said kiln means interconnecting said mixer and said drying means and operative to convey all of the dried slurry from said drying means to said mixer; adjustable proportional dividing means receiving said moist slurry mixture from said single mixer and directing an adjustably controlled portion thereof to said drying means and the remaining portion to said kiln for treatment therein; and means for exhausting hot gases from said kiln into and through said drying means whereby to convert the said moist slurry entering the drying means from said mixer into the aforesaid dried slurry which is supplied by the drying means to said mixer.

2. In an organization of the type described comprising supply means for wet slurry, a kiln adapted to treat the slurry from said supply means after the moisture content thereof has been preliminarily reduced, and slurry drying means including a rotary disintegrator mill and a cyclone collector organized to convert moist slurry into dried slurry by subjecting same to hot gases drawn from said kiln into and through the mill and the collector along with the slurry to be dried, the combination of a single mixer receiving wet slurry from said supply means and also all of the dried slurry from said cyclone collector and serving to mix the two received slurries in proportions which yield a moist slurry mixture that is suitable for treatment in said kiln, and adjustable proportional dividing means receiving said moist slurry mixture from said single mixer and directing an adjustably controlled portion thereof into the disintegrator mill of said drying means and the remaining portion thereof into said kiln for treatment therein.

3. In apparatus for continuously reducing the moisture content of a slurry prior to its treatment in a kiln, the combination of supply means for wet slurry; drying means including a rotary disintegrator mill and a cyclone collector organized to convert moist slurry into dried slurry by subjecting same to hot gases drawn from said kiln into and through the mill and the collector along with the slurry to be dried; a single mixer receiving wet slurry from said supply means and also all of the dried slurry from said collector and serving to mix the two received slurries in proportions which yield a moist slurry mixture that is suitable for treatment in said kiln; and proportional dividing means receiving said moist slurry mixture from said single mixer and directing a controlled portion thereof into said drying means mill and the remaining portion into said kiln for treatment therein and means operative to adjustably control said proportional dividing means to regulate the portion of the mixture directed to the drying means to maintain the moist slurry mixture in said single mixer of a suitable moisture content for delivery to said kiln.

4. In apparatus for continuously reducing the moisture content of a slurry prior to its treatment in a kiln, the combination of a kiln, supply means for wet slurry; drying means organized to convert moist slurry into dried slurry by subjecting same to hot gases discharging from said kiln; a single mixer receiving wet slurry from said supply means and also all of the dried slurry from said drying means and serving to mix the two received slurries in proportions which yield a moist slurry mixture that is suitable for treatment in said kiln; and adjustable proportional dividing means receiving said moist slurry mixture from said single mixer and serving to direct same during alternately recurring time intervals of adjustably controlled relative duration first into said drying means for conversion into said dried sludge and then into said kiln for treatment therein, whereby said moist sludge from the mixer thus delivered in part to the kiln and in remaining part to the drying means has a moisture content dependent upon the relative duration of said alternate time intervals.

5. In apparatus for continuously reducing the moisture content of a slurry prior to its treatment in a kiln, the combination of a kiln, supply means for wet slurry; drying means organized to convert moist slurry into dried slurry by subjecting same to hot gases discharging from said kiln; a single mixer receiving wet slurry from said supply means and also all of the dried slurry from said drying means and serving to mix the two received slurries in proportions which yield a moist slurry mixture that is suitable for treatment in said kiln; and proportional dividing means receiving said moist slurry mixture from said single mixer and directing a controlled portion thereof to said drying means and the remaining portion thereof to said kiln for treatment therein, said dividing means comprising a screw conveyor having a housing whose entrance end receives the moist slurry mixture from said mixer and whose discharge end delivers same into said kiln, a take-off conduit leading to said drying means from said conveyor housing at a point in advance of said discharge end, and an adjustable gate in said conduit for determining how much of said moist slurry mixture flows from the screw conveyor into said drying means.

References Cited in the file of this patent

UNITED STATES PATENTS

| | | |
|---|---|---|
| 961,958 | Hartley | June 21, 1910 |
| 1,627,553 | Fasting | May 10, 1927 |
| 2,023,247 | Senseman | Dec. 3, 1935 |
| 2,125,263 | Ahlmann | Aug. 2, 1938 |
| 2,148,981 | Dundas et al. | Feb. 28, 1939 |
| 2,157,775 | Smith | May 9, 1939 |
| 2,290,068 | Petersen | June 14, 1942 |